March 31, 1964    P. J. BERKELEY, JR., ETAL    3,127,451
CONVERSION OF ALDOX ALDEHYDES TO ALCOHOLS
Filed Jan. 25, 1960
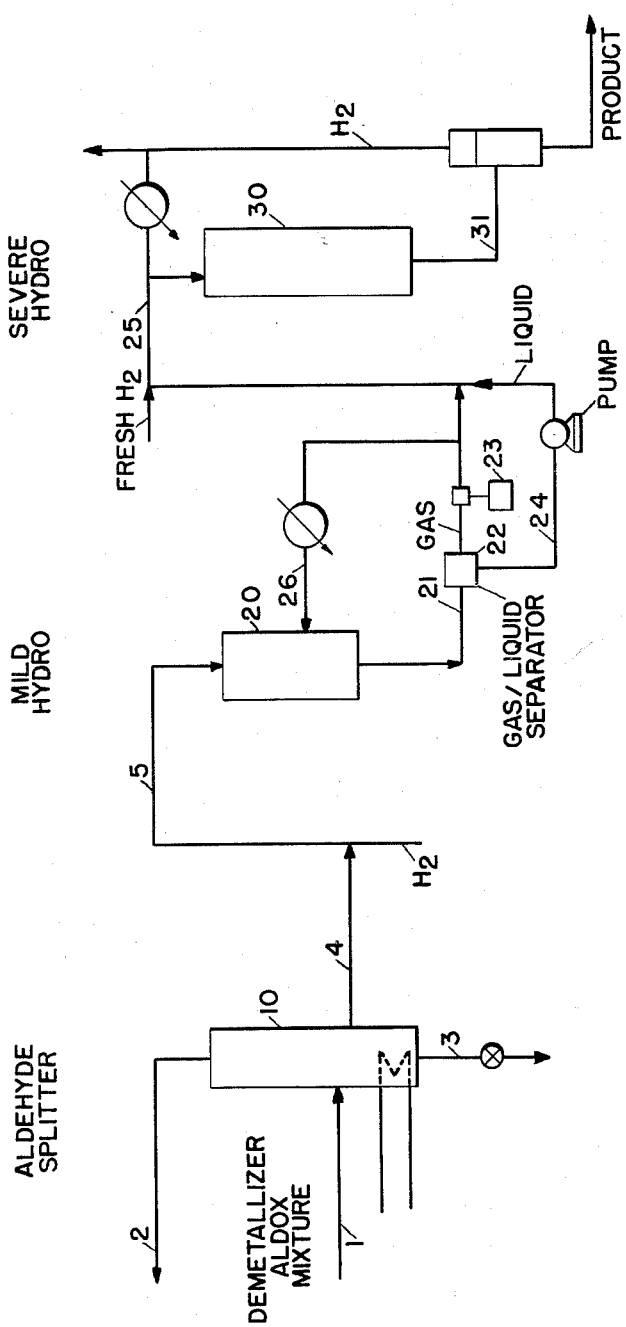
Peter Joseph Berkeley Jr.
Leroy Virgil Robbins Jr.   Inventors
Rhea N. Watts
By *Peter H. Smolka*   Patent Attorney 3,127,451
CONVERSION OF ALDOX ALDEHYDES
TO ALCOHOLS
Peter Joseph Berkeley, Jr., Tulsa, Okla., and Leroy Virgil
Robbins, Jr., Baton Rouge, and Rhea N. Watts, St.
Francisville, La., assignors to Esso Research and Engineering Company, a corporation of Delaware
Filed Jan. 25, 1960, Ser. No. 4,496
8 Claims. (Cl. 260—638)

This invention relates to the manufacture of alcohols such as 2-ethylhexanol from olefins such as propylene via the aldox condensation reaction followed by hydrogenation of the resulting aldox aldehydes. More particularly it relates to an improvement in the hydrogenation step wherein the aldox aldehyde is converted to the desired alcohol. Still more particularly it relates to a multi-pass hydrogenation under increasingly severe conditions whereby unwanted side reactions are minimized and product alcohol yield is increased.

An increasingly important commercial process involves the conversion of lower olefins into aldehydes and alcohols having more than twice as many carbon atoms as the original feed. Essentially this modification of the well-established oxo process involves reaction of the olefin with carbon monoxide and hydrogen in the presence of a cobalt carbonylation catalyst at elevated temperature and pressure whereby the olefin is converted to an aldehyde and an alcohol having one additional carbon atom than the original olefin. The aldehyde resulting from this oxo synthesis is then dimerized by an aldol reaction and dehydrated in the presence of a dimerization-dehydration catalyst such as a zinc compound. This produces aldehydes having twice as many carbon atoms as the intermediate aldehyde.

The aldolization-dehydration step can be carried out directly in the oxo stage by including a metal such as zinc, beryllium, magnesium or barium, or a compound thereof, in the oxo synthesis mixture in addition to a conventional cobalt catalyst. Alternatively, the dimerization-dehydration may be carried out by subjecting the crude aldehyde effluent from a conventional oxo stage to aldolization and dehydration in the presence of zinc or the like in a separate stage. For convenience, both of these alternative oxo-aldol combination processes will be referred to generically as the "aldox process" or the "aldox synthesis." In either case, the resulting dimeric aldox aldehyde can be hydrogenated to give the corresponding alcohol. Thus, for instance, propylene can be converted to 2-ethylhexenal and 2-ethylhexanal and eventually to 2-ethylhexanol, butyraldehyde being the intermediate oxo aldehyde which is aldolized. The metal catalyst residues contained in the crude aldox aldehyde are usually removed therefrom to facilitate its subsequent hydrogenation. The aldox process is desirably carried out in existing oxo alcohol plants, thereby offering a greater variety and flexibility in the products obtainable therefrom. Since the demetallizing step as such does not form an inventive feature herein, it will be described but briefly.

Various ways of removing the metal-containing catalyst residues are well known in the art. For instance, the crude aldox aldehyde can be treated with hot water alone or in the presence of inert gases such as hydrogen, to decompose any cobalt carbonyl compounds and to extract the remaining catalyst metal compounds. The addition of an acid such as acetic acid further aids in the removal of the catalyst residues from the aldehyde phase. Distillation, preferably in combination with a treatment effective for decomposing cobalt carbonyls into oil insoluble compounds, can also be resorted to as a means for obtaining a crude aldox product satisfactory for hydrogenation. However, even after careful demetallizing, the aldehydes made by the aldox process have turned out to be much more difficult to convert to alcohols than are similar aldehydes obtained by ordinary oxo synthesis. In particular, hydrogenation of the crude aldox aldehyde under conditions and with catalysts normally used in the hydrogenation facilities of existing oxo plants has heretofore resulted in relatively low yields of the desired alcohol and in an alcohol product contaminated by a surprisingly high concentration of objectionable carbonyl compounds.

It is an object of the present invention to devise a more effective hydrogenation for converting aldox aldehydes to alcohols. A more specific object is to devise an improved hydrogenation process for aldox aldehydes, which process could be readily used in hydrogenation facilities in existing oxo alcohol plants without major change when switching from the production of oxo alcohols to the production of aldox alcohols and vice versa. Still further objects, and ways of achieving them, will become apparent from the subsequent description.

It has now been discovered that the difficulties heretofore encountered in the hydrogenation of crude aldox aldehydes can be substantially avoided by effecting the hydrogenation in several stages. More particularly it has been discovered that the earlier difficulties in hydrogenating the crude aldox aldehyde are attributable to at least two different effects. Firstly, it appears that under the conditions normally employed in hydrogenating oxo aldehydes, i.e. at hydrogenation temperatures of about 450° F. to 500° F. or higher in the presence of a molybdenum sulfide catalyst, high boiling components present in the crude aldox aldehyde give rise to carbonyl compounds boiling in the range of the desired product alcohol. Secondly, it appears that the aldehyde precursor of the desired product alcohol is a mixture of a saturated aldehyde with a very considerable proportion of the corresponding unsaturated aldehyde, and the latter decomposes extensively to yield hydrocarbons under the normal hydrogenation conditions. In both of these respects the crude aldox product differs markedly from the crude product of an ordinary oxo synthesis.

According to the present invention the undesirable side reactions mentioned above can be avoided by first selectively hydrogenating the crude aldox product in contact with a sulfactive hydrogenation catalyst, e.g. molybdenum sulfide, under relatively mild conditions, i.e. at temperatures between about 350° and 400° F. and a pressure of about 3000 p.s.i.g., so as to convert the relatively unstable unsaturated aldehyde and high boiling components into more stable saturated compounds. Only then is the mildly hydrogenated crude aldox aldehyde hydrogenated to the alcohol over molybdenum sulfide under conventional conditions, i.e. at temperatures between about 450° and 525° F. and pressure of about 3000 p.s.i.g. The second hydrogenation step can be carried out in a separate vessel. However, since the same catalyst is used in both hydrogenation steps, both of these can be carried out in the same hydrogenation reactor, provided that a blocked operation is used wherein the hydrogenated product from the first step is run to storage until it is rerun through the reactor after proper adjustment of hydrogenation conditions. Unlike the more sensitive hydro-finishing catalysts such as nickel or palladium which are efficient at relatively low pressure, the molybdenum sulfide used in the hydrogenation stage of this invention has the advantage that it is not sensitive to carbon monoxide or to any cobalt residues which may be present in the crude aldox product. Somewhat similar advantages can be obtained by conducting the two-step hydrogenation with other CO-insensitive catalysts such as cobalt molybdate or copper chromite, but molybdenum sulfide is particularly preferred.

The present invention is generally applicable to the manufacture by the aldox process of alcohols having the formula $R.CH_2OH$ wherein R is a straight or branched chain alkyl radical of $2n+1$ carbon atoms from mono-olefinic hydrocarbons having $n$ carbon atoms per molecule, $n$ in each instance being an integer ranging from 2 to 5. Suitable olefins thus include ethylene, propylene, butene-1, butene-2, isobutylene, as well as any pentene isomers which on oxonation produce an aldolizable aldehyde, i.e. an aldehyde having at least one hydrogen atom on the carbon adjacent to the carbon forming the carbonyl group. Propylene is a particularly suitable feed stock for the aldox process and is therefore preferred.

The olefin feed is reacted with a synthesis gas mixture containing hydrogen and carbon monoxide in a ratio between about 0.5 to 4 volumes of hydrogen per volume of carbon monoxide, $H_2/CO$ volume ratios between 1/1 and 2/1 being preferred. The optimum conditions for reacting the olefin with the synthesis gas varies somewhat depending on the nature of the olefin feed, but generally the reaction is conducted at pressures of about 1500 to 4500 p.s.i.g., preferably 2500 to 3500 p.s.i.g., and at temperatures in the range of from about 250° to 400° F., preferably at 320° to 360° F. About 2500 to 25,000 cubic feet of synthesis gas (measured at standard temperature and pressure), preferably 4,000 to 6,000 standard cubic feet, per barrel of liquid olefin feed are normally employed.

In the one-step "aldox" process the catalyst for this reaction is a mixture of cobalt and zinc compounds supplied in a water insoluble form, e.g., in the form of metal powder or turnings or in the form of metal salts of $C_6$ to $C_{18}$ fatty acids, such as hexanoic, octanoic, decanoic, lauric, stearic, oleic, linoleic, or other suitable organic acids such as naphthenic. In this manner cobalt is generally added to the extent of 0.2 to 0.5% calculated as metal on olefin feed, while the dehydro-aldolization catalyst such as zinc is added to the extent of 0.05 to 0.5%, preferably 0.1 to 0.2%. This crude liquid aldehyde product from this synthesis contains a mixture of both monomer and dimer aldehydes and alcohols as well as the catalyst, substantially as described in U.S. Patent 2,811,567 to which reference may be had for further details.

Alternatively, instead of converting the olefin to the dimer aldehyde in one step by the so-called aldox reaction just described, the present invention is similarly applicable to dimer aldehydes obtained by the two-step process wherein the crude aldehyde obtained in a conventional oxo synthesis is aldolized or dimerized in the presence of a metal such as zinc or its water-insoluble compounds as hereinbefore described, without intervening removal of the cobalt catalyst used in the oxo step. The general operation of such a process is described in U.S. Patent 2,820,067 to which reference may be had for further details. The oxo step of the two-step process is carried out under substantially the same conditions as those described hereinbefore with reference to the one-step aldox synthesis except that, due to the absence of the aldolization catalyst in the conventional oxo step, the cobalt concentration in the latter may be reduced to 0.1% or even less, based on the olefin feed.

Taking the manufacture of 2-ethylhexanol from propylene as an example, it will be understood that both the one-step process and the two-step process involve the following combination or sequence of reactions:

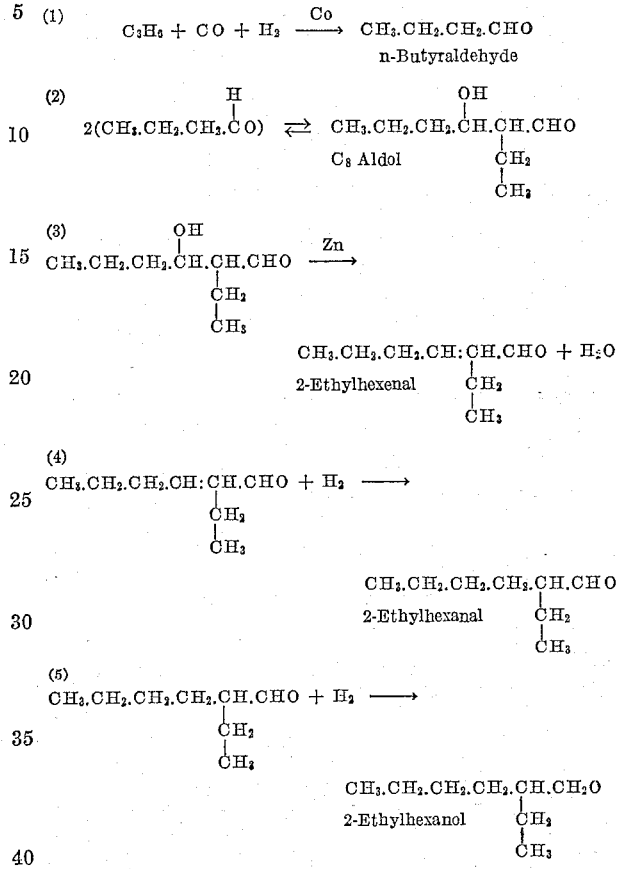

Both the one-step process and the two-step process result in a crude aldehyde mixture, hereinafter referred to as the "crude aldox mixture," which contains as principal products the unsaturated and saturated dimer aldehydes corresponding to reactions (3) and (4) described above, as well as varying amounts of monomer aldehydes, some dimeric aldol corresponding to the product of reaction (2), the corresponding alcohols, heavy condensation products and the metal-containing catalyst residues. Under favorable conditions the crude product fraction corresponding to the desired intermediate aldehyde having $2n+2$ carbon atoms will contain about 20 to 40% of the unsaturated dimer aldehyde and correspondingly about 80 to 60% of the saturated dimer aldehyde. However, under some reaction conditions, e.g. at relatively low synthesis gas rates or low hydrogen partial pressure, the unsaturated aldehyde may easily amount to 50% or more of the dimer aldehyde fraction. The crude aldox mixture from the synthesis step is then demetallized by any known procedure, e.g. by scrubbing with aqueous acetic acid, and the demetallized aldox mixture is finally converted to the desired alcohol by hydrogenation, the alcohol being recovered from the hydrogenated mixture by distillation. It is with the hydrogenation step that the present invention is concerned.

According to the present invention, the demetallized crude aldox mixture is preferably first fractionated to remove therefrom monomeric aldehydes and alcohols, i.e. compounds having only one more carbon atom than the initial olefin feed. Heavy bottoms, i.e. compounds having more carbon atoms per molecule than the desired dimer aldehydes, may also be separated from the main aldehyde fraction in this distillation. However, the removal of bottoms is not necessary, as one of the advantages of the present invention is that the bottoms may be further processed together with the dimer aldehydes and additional product alcohol obtained thereby. The crude aldox mixture stripped of monomeric compounds is now stabilized by a mild hydrogenation treatment aimed mainly at saturating any unsaturated dimer aldehydes and decomposing and saturating any relatively unstable heavy condensation products before they are subjected to the more severe hydrogenation step. The CO-tolerant catalyst used in both hydrogenation steps is preferably the same, e.g. molybdenum sulfide, cobalt molybdate or copper chromite. A particularly desirable form of hydrogenation catalyst is known to be obtained by impregnating preformed char pellets with an aqueous solution of ammonium molybdate, drying the impregnated pellets and sulfiding the dry pellets in a stream of hydrogen sulfide or with carbon bisulfide, the latter preferably dissolved in a suitable inert solvent.

In the first, mild hydrogenation step the aldox mixture is treated with hydrogen at 350° F. to 400° F. and a pressure of about 2000 to 4000 p.s.i.g., using a hydrogen gas rate of about 1000 to 5000 or even 10,000 cubic feet per barrel of feed and allowing a liquid residence time of about 3 to 6 hours. The hydrogen gas used in the hydrogenation may contain 1 to 10 mole percent of carbon monoxide without requiring purification.

In the second hydrogenation step wherein the aldehydes from the first step are converted to the desired alcohol product, more severe reaction conditions are employed as follows: temperature 450° F. to 525° F.; pressure 2000 to 4000 p.s.i.g., $H_2$ gas rate 1000 to 5000 cubic feet or even 10,000 cubic feet per barrel; residence time 6 to 12 hours. The hydrogen treat gas again may contain 1 to 10 mole percent carbon monoxide without requiring purification and without thereby impairing the efficiency of the hydrogenation step. While normally 3,000 cubic feet of hydrogen per barrel is more than enough to accomplish the desired degree of hydrogenation in each of the two stages, excess hydrogen is frequently fed for the purpose of cooling the reaction. Finally, the hydrogenated product mixture is distilled to recover the desired alcohol fraction.

A specific embodiment of the invention will next be described in connection with the manufacture of 2-ethylhexanol from propylene via the known aldox process. The aldox synthesis is carried out under the following conditions:

| Feed | Propylene | |
|---|---|---|
| Catalyst | {Cobalt oleate | 0.25% on propylene. |
| | Zinc decanoate | 0.15% on propylene. |
| $H_2$/CO | 1.5 | Mole/mole. |
| Synthesis gas rate | 3,500 | S.c.f./barrel of propylene (Liquid). |
| Temperature | 325° F | |
| Pressure | 3,000 | |
| Olefin feed rate | 0.5 volume per volume of reactor per hour. | |

As described in U.S. 2,811,567, the crude aldox mixture rich in $C_8$ aldehydes is withdrawn from the synthesis reactor, cooled to about 100° F., and unreacted gases are separated from the liquid aldox mixture. The gas-liquid separation is commonly effected in two or more stages, first at high pressure and then at or near atmospheric pressure. The degasified liquid product is then passed to a catalyst removal stage where it is treated with aqueous acetic acid (1% on aldehyde) at a temperature of about 180° F. to remove the cobalt and zinc catalyst from the crude aldox mixture, all in accordance with procedures now well known in the art. Hydrogen can also be added to the demetallizing stage. This has been found helpful in promoting decomposition of any cobalt carbonyl present. In addition, the demetallizing of aldox mixtures in the presence of hydrogen has been found surprisingly beneficial in the present context since, especially if the temperature in the demetallizing stage is sufficiently high, e.g. at 350° to 500° F., the hydrogen in this stage also tends to make the organic product less susceptible to decomposition in the main aldehyde hydrogenation stage.

The demetallized crude aldox mixture described above is next treated according to the present invention as illustrated in the attached drawing. Referring to the drawing, the demetallized aldox mixture is passed via line 1 to distillation tower 10. Hence $C_4$ aldehydes and alcohols as well as any remaining light olefins are taken overhead via line 2 and processed in any desired manner, e.g. to recover butyraldehyde and butanol therefrom. In a once-through operation the $C_4$ aldehydes and other light ends may amount to about 25 to 50 weight percent of the crude aldox mixture. If desired, the $C_4$ aldehyde may be recycled to the aldox reactor. Heavy bottoms may, but need not, be purged from the system via line 3. The main product, comprising a $C_8$ aldehyde fraction composed of about 50 to 80% 2-ethylhexanol and 50 to 20% 2-ethylhexenal, e.g. about 60% of the former and about 40% of the latter and having a carbonyl number of between about 350 and 450, is withdrawn from tower 10 via line 4. It is mixed with hydrogen at a pressure of about 2,000 to 4,000 p.s.i.g., preferably 3,000 p.s.i.g., and passed at this pressure via line 5 through hydrogenation vessel 20. Vessel 20 is packed with catalyst pellets composed of molybdenum sulfide on activated char pellets and maintained at a temperature between about 350° and 400° F., i.e. at about 400° F. As a result of this selective hydrogenation treatment, the concentration of unsaturated aldehydes in the mixture is reduced to less than 10%, preferably to between 0 and 2%. Hydrogen consumption in this stage amounts to about 200 to 2,000, e.g. 1,500 s.c.f. per barrel of crude aldehyde feed. The hydrogen consumption depends on the extent of alcohol formation which accompanies the saturation of the double bond in this stage. The first stage may either convert very little of the aldehyde to alcohol or it may convert very substantial amounts of aldehyde to alcohol, in addition to saturating the double bonds.

The selectively hydrogenated aldox mixture and hydrogen gas are withdrawn from vessel 20 via line 21 to a liquid-gas separator 22. The hydrogen is compressed in compressor 23 to about 2,000 to 4,000 p.s.i.g., e.g. 3,000 p.s.i.g., mixed with fresh hydrogen if necessary and passed with the separator liquid at this pressure through line 35 to high-pressure hydrogenation vessel 30. If desired, a portion of any excess hydrogen withdrawn from separator 22 may be cooled and recycled via line 26 to hydrogenation vessel 20 for cooling purposes. Vessel 30 is packed with catalyst pellets composed of molybdenum sulfide on activated char and maintained at a temperature of about 475° F., i.e. between about 450 and 500° F. About 2,000 to 4,000 s.f.c., e.g. 3,000 s.c.f. of hydrogen gas is supplied to vessel 30 per barrel of liquid feed thereto. The hydrogen consumption in vessel 30 is about 25 to 500 s.c.f. of hydrogen per barrel of liquid feed. The hydrogenated product withdrawn from vessel 30 via line 31 contains a major proportion of 2-ethylhexanol and minor proportions of lighter products such as n-butanol and isobutyl alcohol as well as heavier fractions such as acetals, esters, $C_{16}$ alcohols, etc. Pure 2-ethylhexanol can be recovered from the hydrogenated product mixture by fractional distillation.

The advantages of the present invention are further illustrated by the data shown in Table I. These data were obtained in treating a demetallized crude $C_8$ aldox mixture (corresponding to stream 4 of the foregoing example) in accordance with the present invention.

TABLE I

*Preparation of 2-Ethyl Hexanol From $C_8$ Aldox Aldehyde*

|  | Aldehyde Feed | Two-Step Hydrogenation | | One-Step Hydro |
|---|---|---|---|---|
|  |  | Mild Hydro | Severe Hydro |  |
| Hydrogenation Conditions: |  |  |  |  |
| Temperature, °F |  | 400 | 470 | 474 |
| Pressure, p.s.i.g. |  | 3,000 | 3,000 | 3,000 |
| Hydrogen treat, s.c.f./barrel (outlet) |  | 2,600 | 2,600 | 2,320 |
| Hydrogen consumption, s.c.f./barrel (approx.) |  | 1,000 | 150 | 1,300 |
| Product Characteristics: |  |  |  |  |
| Carbonyl No.— |  |  |  |  |
| Total product |  | 12.1 | 1.04 | 0.84 |
| 2-ethylhexanol cut | 409 | 3.9 | 0.39 | 0.63 |
| Product Distribution, wt. percent— |  |  |  |  |
| Light ends |  | 0.0 | 3.6 | 15.1 | 36.2 |
| $C_8$ fraction | 61.0 | 56.2 | 60.1 | 45.2 |
| Wt. percent unsaturated aldehyde in $C_8$ fraction | 24 | 0 | 0 | 0 |
| Wt. percent Alcohol in $C_8$ fraction | 11 | 97+ | 99+ | 99+ |
| Bottoms | 39.0 | 40.2 | 24.8 | 18.6 |

The first three columns of Table I show that the two-step hydrogenation of the present invention gives excellent selectivities to yield 2-ethylhexanol of excellent quality as reflected by a carbonyl number of less than 0.5. While some of the aldehyde feed is converted to light products such as butyraldehydes and hydrocarbons, e.g. 3-methyl heptane, a very substantial proportion of the bottoms present in the aldehyde feed is converted to 2-ethylhexanol so that about one pound of 2-ethylhexanol is netted per pound of $C_8$ aldehyde fed to the hydrogenation. The data show that in the two-stage hydrogenation an extensive though incomplete conversion of aldehyde to alcohol can be obtained in the first stage. However, equally good and sometimes even better overall results can be obtained when the first stage is conducted more selectively to primarily saturate the unsaturated aldehyde, and the alcohol production is carried out mainly in the second stage.

By contrast when the crude aldox mixture is fed directly to the high-severity hydrogenation stage 30, bypassing the selective hydrogenation stage 20, a considerable amount of light ends is produced at the expense of the desired 2-ethylhexanol and the redistilled 2-ethylhexanol product fraction has an undesirably high carbonyl number.

Of course, it will be understood that the invention may be embodied in operating schemes other than the one illustrated in the attached drawing. For instance, instead of having separate reactors 20 and 30, it is possible to omit reactor 20 altogether and to use the same high-pressure vessel 30 in a blocked operation first to carry out the selective hydrogenation step and then rerunning the selectively hydrogenated aldehyde mixture through it under more severe temperature conditions whereby the aldehydes are converted to the desired alcohol.

As another alternative, it is possible to carry out both hydrogenation steps in a single reactor, provided that the reactor has the proper geometric configuration, i.e. length, staging, etc. In such a case a temperature gradient is imposed on the reactor, providing a temperature of about 350° to 400° F. at its inlet end and increasing to a maximum of about 475° to 500° F. at the outlet end. The temperature gradient can be imposed in a variety of ways. For instance, an intermediate reheat stage can be provided by passing a portion of the selectively hydrogenated aldehyde stream through a furnace or heat exchanger and returning it to the middle of the hydrogenation tower. Alternatively, internal heating coils can be installed directly within an intermediate portion of the hydrogenation oven to provide the required heat for the high-severity stage.

Also it will be understood that in the foregoing example the heavy bottoms were hydrogenated together with the $C_8$ aldehyde fraction, but that sometimes it may be preferable to hydrogenate the $C_8$ fraction in the absence of the bottoms. In this manner a still further improvement in product alcohol quality can be obtained, though at the expense of some yield loss. If desired, however, additional alcohol may be recovered by treating the bottoms in a separate operation.

The nature, operation and advantages of the invention have been illustrated in the foregoing description. It will be understood, however, that various modifications and variations not described herein are possible without departing from the scope of the present invention as defined in the appended claims.

The claimed invention is:

1. A process for obtaining an alcohol having $2n+2$ carbon atoms per molecule and a carbonyl number of less than about 0.5, $n$ being an integer from 2 to 5 which comprises contacting a crude demetallized mixture containing aldehydes having $2n+2$ carbon atoms per molecule and unsaturated aldehydes, obtained from reaction of an olefin having the formula $C_nH_{2n}$ with carbon monoxide and hydrogen at elevated temperature and pressure in the presence of a cobalt and zinc-containing catalyst and subsequently removing residual catalytic metals, in a first stage with hydrogen at a pressure of about 2000 to 4000 p.s.i.g. and at a temperature of about 350–400° F. in the presence of a catalyst selected from the group consisting of molybdenum sulfide, cobalt molybdate and copper chromite for a period of 3 to 6 hours to convert unsaturated aldehydes in said crude mixture to saturated aldehydes without substantial formation of alcohols, contacting the thus hydrogenated mixture in a second stage with hydrogen at a pressure of 2000–4000 p.s.i.g. and a temperature of about 450 to 525° F. in the presence of said catalyst for a residence period of 6 to 12 hours to convert said saturated aldehydes to alcohols.

2. A process according to claim 1 wherein the crude aldehyde mixture is fractionally distilled to remove therefrom compounds having less than $2n$ carbon atoms per molecule before passing said aldehyde mixture to said first hydrogenation stage.

3. A process according to claim 1 wherein the $C_{2n+2}$ aldehyde mixture being fed to said first hydrogenation stage contains about 20 to 50% of unsaturated aldehyde and 80 to 50% of saturated aldehyde and has a carbonyl number of between about 350 and 450.

4. A process according to claim 1 wherein the $C_{2n+2}$ fraction of the selectively hydrogenated mixture withdrawn from the first stage contains a carbonyl number of between about 10 and 50.

5. In a process for making 2-ethylhexanol wherein propylene is reacted with carbon monoxide and hydrogen under aldox conditions in the presence of a catalyst system comprising cobalt and zinc to form a liquid mixture rich in $C_8$ aldehydes, and wherein catalyst residues and $C_4$ and lighter compounds are removed from said liquid mixture to produce a demetallized aldox mixture comprising principally $C_8$ and heavier compounds, the improvement which comprises contacting said demetallized aldox mixture with hydrogen gas in a selective hydrogenation stage in the presence of a catalyst consisting of molybdenum sulfide on char at a temperature between about 350° and 400° F. and a pressure between about 2,000 and 4,000 p.s.i.g. such that unsaturated aldehyde is converted to saturated aldehyde, then contacting the selectively hydrogenated aldox mixture with hydrogen in another hydrogenation stage in the presence of a catalyst consisting of molybdenum sulfide on char at a temperature between about 450° and 525° F. and at a pressure between about 2,000 and 4,000 p.s.i.g., and recovering from the resulting mixture a 2-ethylhexanol fraction characterized by a carbonyl number of less than 0.5.

6. A process according to claim 5 wherein the hydrogen gas used in said selective hydrogenation stage contains 1 to 10 mole percent of carbon monoxide.

7. A process according to claim 5 wherein the demetallized aldox mixture is fractionally distilled prior to selective hydrogenation to remove therefrom compounds containing more than eight carbon atoms per molecule.

8. A process according to claim 5 wherein the $C_8$ aldehyde fraction of the crude demetallized aldox mixture contains about 20 to 50% of 2-ethylhexenal before the selective hydrogenation and about 0 to 2% of 2-ethylhexenal after the selective hydrogenation.

References Cited in the file of this patent

UNITED STATES PATENTS

| | | |
|---|---|---|
| 2,638,488 | Cerveny | May 12, 1953 |
| 2,710,829 | Michael | May 9, 1955 |
| 2,771,493 | Jacks et al. | Nov. 20, 1956 |
| 2,811,567 | Mason | Oct. 29, 1957 |
| 2,820,067 | Mertzweiller et al. | Jan. 14, 1958 |
| 2,983,734 | Sargent | May 9, 1961 |

OTHER REFERENCES

Groggins: Unit Processes in Organic Synthesis, 4th edition, 1952, pages 572, 573, 583.

Orito: Japanese Govt. Chem. Ind. Research Inst., vol. 48, 1953, page III.